UNITED STATES PATENT OFFICE.

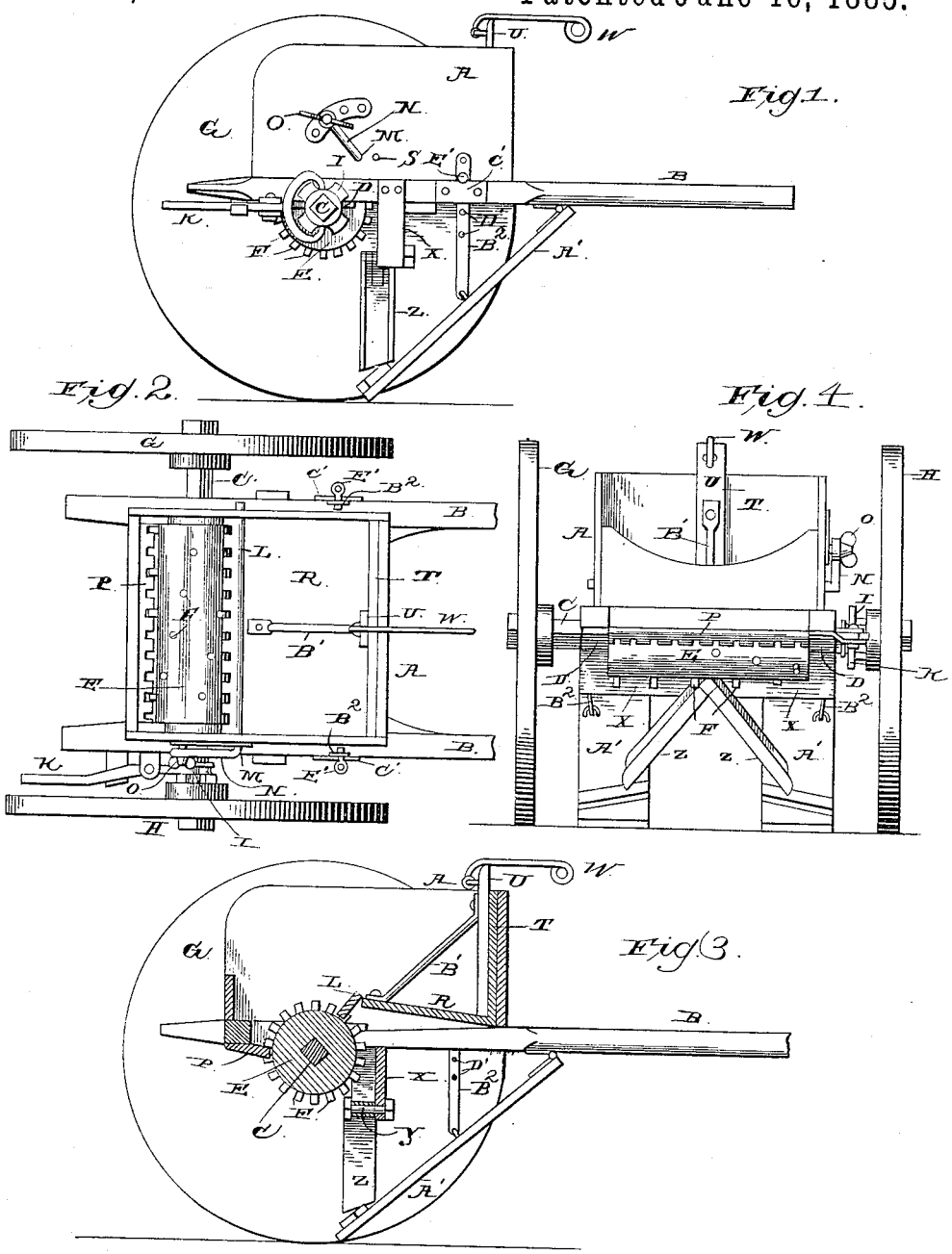

ANDREW JACKSON HEARNE, OF BATTLEBOROUGH, NORTH CAROLINA.

MANURE-DRILL.

SPECIFICATION forming part of Letters Patent No. 320,133, dated June 16, 1885.

Application filed April 23, 1885. (No model.)

*To all whom it may concern:*

Be it known that I, ANDREW J. HEARNE, a citizen of the United States, residing at Battleborough, in the county of Nash and State of North Carolina, have invented a new and useful Improvement in Manure-Drills, of which the following is a specification, reference being had to the accompanying drawings.

My invention relates to an improvement in manure-distributers; and it consists in the peculiar construction and combination of devices, that will be more fully set forth hereinafter, and particularly pointed out in the claims.

In the accompanying drawings, Figure 1 is a side elevation of my invention with the driving-wheel removed. Fig. 2 is a top plan view of the same. Fig. 3 is a vertical longitudinal section. Fig. 4 is a rear elevation.

A represents the body of a cart having the shafts B, in the usual manner. Near the rear ends of these shafts, which pass under the body of the cart, is journaled a rotating shaft, C, in blocks D, which are bolted to the under sides of the shafts.

A cylinder, E, is fixed to the shaft C, and is provided with projecting teeth F. This cylinder extends between the shafts, and may be made of wood or metal, as preferred.

On one end of the shaft is loosely mounted a wheel, G, and on the opposite end is loosely mounted a wheel, H.

I represents a clutch, which slides back and forth on the projecting end of the shaft for engaging with the wheel H and securing said wheel to the shaft. This clutch is operated by means of a hand-lever, K, which extends rearwardly beyond the end of the cart-body, so as to be within easy reach.

L represents a plate, which is journaled, in between the sides of the cart body, as at M, and is provided at one end with a crank-arm, N. Through the outer end of this arm passes a set-screw, O, by means of which the plate may be secured either with its lower edge in contact with the cylinder or raised above said cylinder to any desired extent. In said lower edge of the plate L is cut a series of serrated teeth, to enable the spikes of the cylinder to pass through as the cylinder revolves.

An immovable plate or scraper, P, is secured to the under side of the cart, at the rear end thereof, and bears against the rear side of the cylinder. The bottom R of the cart is hinged therein at the points S, and from the front edge of this bottom rises a vertical endboard, T, which bears against the real end of the body of the cart.

A vertical standard, U, is secured centrally on the inner side of the end T, and is braced by means of the brace B'.

To the upper end of the standard U is secured a hand-loop or bail, W, by means of which the bottom may be tilted so as to cause all the manure in the cart to fall upon the revolving cylinder until the cart is entirely empty.

Transversely across the under sides of the shafts, below the center of the cart-body, is bolted a beam, X, to the center of which is secured a horizontal rearwardly-extending spindle, Y.

Z represents conductors or spouts, which are hinged at their upper ends upon the spindle Y, and extend downwardly and outwardly therefrom.

Fenders A' are hinged at their front ends to the under sides of the shafts, and extend downwardly and rearwardly to the ground. The lower ends of the conductors or spouts Z rest upon the upper sides of the fenders, near the lower ends thereof. By this construction it will be readily understood that as the machine is being drawn along, in the event of a stump, rock, or other obstruction striking against one of the fenders, said fender would rise and pass over the obstruction without injury, and lift the conductor that rests upon it also.

To the fenders are pivoted vertically-extending rods $B^2$, that pass up through keepers C', secured to the outer sides of the shafts. A series of openings, D', is formed in each one of the rods $B^2$, and through said openings pass pins E', which secure the lower ends of the fenders at any desired distance above the ground, but permit said fenders to rise in the event that they should strike an obstruction.

Having thus described my invention, I claim—

1. The combination of the box or body having the hinged bottom, the journaled plate, and the rotating cylinder, and the scraper bearing against the rear side of the cylinder, with the hinged conductors Z below said cylinder, adapted to swing outwardly, and the hinged fenders A', adapted to swing rearwardly, upon the lower ends of which rest the free ends of the conductors, substantially as described.

2. The combination of the body, the rotating cylinder journaled therein, the hinged conductors Z below said cylinder, adapted to swing outwardly, and the hinged fenders A', adapted to swing rearwardly, upon the lower ends of which rest the free ends of the conductors, substantially as described.

3. The combination of the wagon or cart, the rotating cylinder journaled therein, the conductors Z, hinged below the cylinder, adapted to swing outwardly, the hinged fenders A', adapted to swing rearwardly and raise the conductors Z, upon which the lower ends of the hinged conductors bear, the rods $B^2$, passing through the keepers C', and having the openings D' and the pins E', substantially as described.

In testimony that I claim the foregoing as my own I have hereto affixed my signature in presence of two witnesses.

ANDREW JACKSON HEARNE.

Witnesses:
JOS. P. STEWART,
A. J. HOBGOOD.